United States Patent
Alsop et al.

(10) Patent No.: US 12,254,217 B2
(45) Date of Patent: *Mar. 18, 2025

(54) DYNAMIC MULTI-BANK MEMORY COMMAND COALESCING

(71) Applicant: Advanced Micro Devices, Inc., Santa Clara, CA (US)

(72) Inventors: Johnathan Alsop, Bellevue, WA (US); Shaizeen Dilawarhusen Aga, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/311,166

(22) Filed: May 2, 2023

(65) Prior Publication Data

US 2023/0266924 A1     Aug. 24, 2023

Related U.S. Application Data

(63) Continuation of application No. 16/900,526, filed on Jun. 12, 2020, now Pat. No. 11,681,465.

(51) Int. Cl.
*G06F 3/06* (2006.01)
(52) U.S. Cl.
CPC .......... *G06F 3/0659* (2013.01); *G06F 3/0604* (2013.01); *G06F 3/0644* (2013.01); *G06F 3/0673* (2013.01)
(58) Field of Classification Search
CPC .... G06F 3/0659; G06F 3/0604; G06F 3/0644; G06F 3/0673
See application file for complete search history.

(56) References Cited

U.S. PATENT DOCUMENTS

| 6,400,631 B1 | 6/2002 | Williams et al. |
| 7,362,643 B2 | 4/2008 | Okada |

(Continued)

FOREIGN PATENT DOCUMENTS

| JP | H11-328095 A | 11/1999 |
| JP | 2003-272384 A | 9/2003 |

(Continued)

OTHER PUBLICATIONS

Office Action in JP Patent Application No. 2022-574752 dated Jul. 18, 2023, 15 pages.

(Continued)

*Primary Examiner* — Edward J Dudek, Jr.
(74) *Attorney, Agent, or Firm* — Kowert, Hood, Munyon, Rankin & Goetzel, P.C.; Rory D. Rankin

(57) ABSTRACT

Systems, apparatuses, and methods for dynamically coalescing multi-bank memory commands to improve command throughput are disclosed. A system includes a processor coupled to a memory via a memory controller. The memory also includes processing-in-memory (PIM) elements which are able to perform computations within the memory. The processor generates memory requests targeting the memory which are sent to the memory controller. The memory controller stores commands received from the processor in a queue, and the memory controller determines whether opportunities exist for coalescing multiple commands together into a single multi-bank command. After coalescing multiple commands into a single combined multi-bank command, the memory controller conveys, across the memory bus to multiple separate banks, the single multi-bank command and a multi-bank code specifying which banks are targeted. The memory banks process the command in parallel, and the PIM elements process the data next to each respective bank.

20 Claims, 7 Drawing Sheets

(56) References Cited

U.S. PATENT DOCUMENTS

| | | | |
|---|---|---|---|
| 7,492,368 B1 | 2/2009 | Nordquist et al. | |
| 8,151,044 B2 | 4/2012 | Proesbsting | |
| 10,503,670 B2 | 12/2019 | Shen et al. | |
| 10,579,303 B1 | 3/2020 | Li et al. | |
| 11,681,465 B2* | 6/2023 | Alsop | G06F 3/0673 711/154 |
| 2002/0067649 A1 | 6/2002 | Kitamoto et al. | |
| 2003/0217223 A1* | 11/2003 | Nino, Jr. | G11C 7/1042 711/105 |
| 2007/0156946 A1* | 7/2007 | Lakshmanamurthy | G06F 13/28 711/158 |
| 2007/0156976 A1 | 7/2007 | Mathews et al. | |
| 2013/0182522 A1 | 7/2013 | Lim et al. | |
| 2013/0212330 A1 | 8/2013 | Brittain et al. | |
| 2014/0185403 A1 | 7/2014 | Lai | |
| 2015/0206574 A1 | 7/2015 | Greathouse et al. | |
| 2015/0318035 A1 | 11/2015 | Dong et al. | |
| 2016/0307619 A1 | 10/2016 | Chang et al. | |
| 2017/0040050 A1 | 2/2017 | Chang et al. | |
| 2018/0025773 A1 | 1/2018 | Bains et al. | |
| 2018/0046389 A1 | 2/2018 | Park et al. | |
| 2021/0073622 A1 | 3/2021 | Yudanov et al. | |
| 2021/0216243 A1 | 7/2021 | Shin et al. | |

FOREIGN PATENT DOCUMENTS

| | | | |
|---|---|---|---|
| JP | 2007095233 A | 4/2007 | |
| JP | 2010-218350 A | 9/2010 | |
| JP | 2017-534943 A | 11/2017 | |
| WO | 2015025357 A1 | 2/2015 | |
| WO | 2016137760 A1 | 9/2016 | |

OTHER PUBLICATIONS

Office Action in CN Patent Application No. 202180041208.6 dated Aug. 30, 2023, 11 pages.

Notice of Allowance in Korean Patent Application No. 10-2022-7046091 dated May 17, 2024, 5 pages.

International Search Report and Written Opinion in International Application No. PCT/US2018/051774, mailed Dec. 21, 2018, 12 pages.

Chatterjee et al., "Architecting an Energy-Efficient DRAM System for GPUs", 2017 IEEE International Symposium on High Performance Computer Architecture (HPCA), Feb. 2017, pp. 73-84, https://niladrish.org/pubs/hpca17.pdf. [Retrieved Mar. 12, 2020].

Naumov et al., "Deep Learning Recommendation Model for Personalization and Recommendation Systems", May 31, 2019, 10 pages, https://arxiv.org/pdf/1906.00091.pdf. [Retrieved Mar. 12, 2020].

International Search Report and Written Opinion in International Application No. PCT/US2021/037290, mailed Oct. 1, 2021, 12 pages.

Office Action in European Patent Application No. 21740306.2 dated Feb. 14, 2024, 8 pages.

* cited by examiner

DYNAMIC MULTI-BANK MEMORY COMMAND COALESCING

CROSS REFERENCE TO RELATED APPLICATIONS

This application is a continuation of U.S. patent application Ser. No. 16/900,526, entitled "DYNAMIC MULTI-BANK MEMORY COMMAND COALESCING", filed Jun. 12, 2020, the entirety of which is incorporated herein by reference.

BACKGROUND

Description of the Related Art

Compute capability has been growing faster than memory bandwidth in computer systems. At the same time, emerging technologies such as processing in memory (PIM) have been proposed to address this problem, but they are shifting the balance of command and data bandwidth demand in dynamic random-access memory (DRAM) devices. This exposes memory command bandwidth as a new potential bottleneck.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

Figure 1:
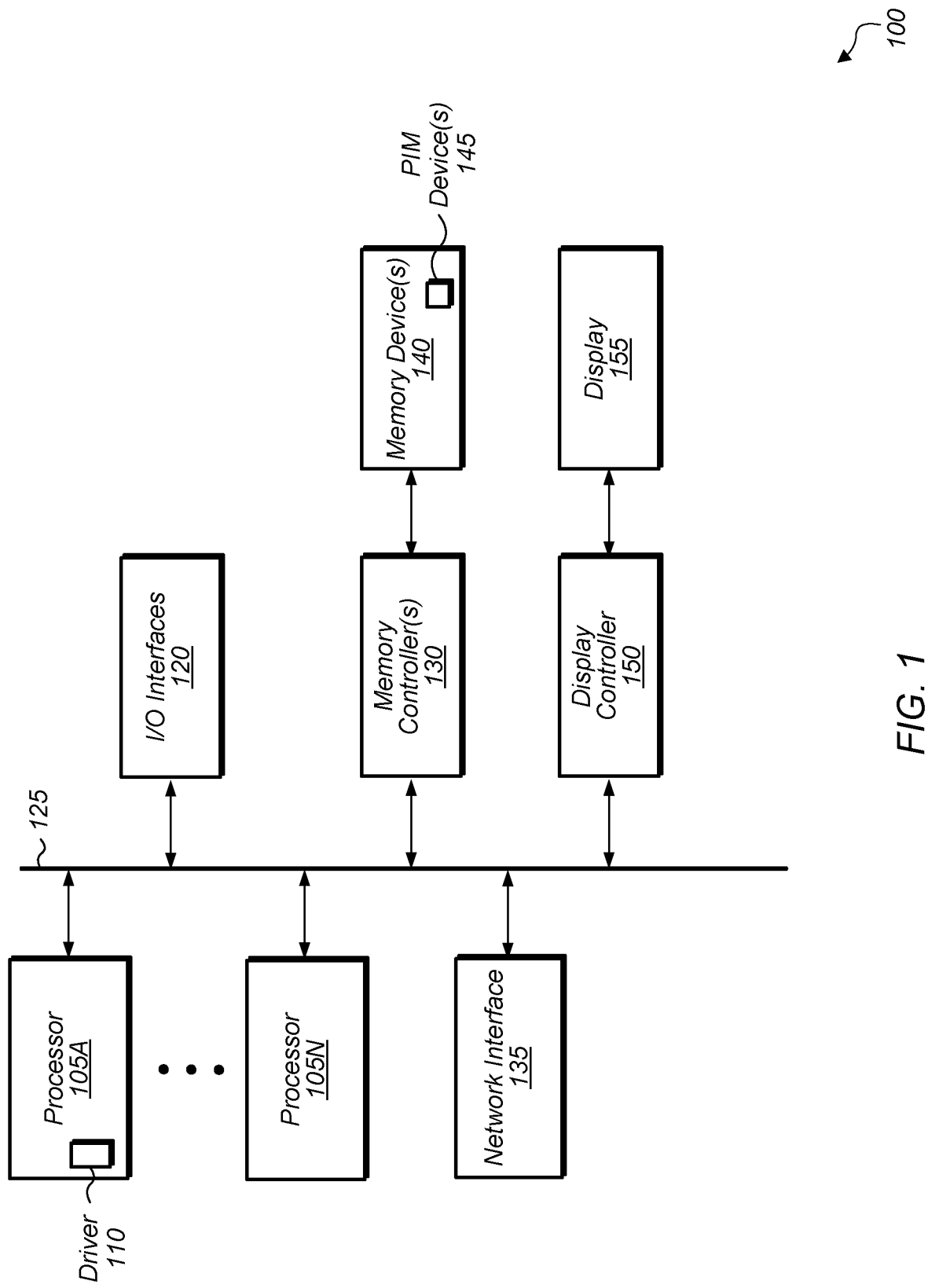
FIG. 1 is a block diagram of one implementation of a computing system.

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for dynamically coalescing multi-bank memory commands to improve command throughput are disclosed herein. In one implementation, a system includes mechanisms for enabling dynamic coalescing of requests in the memory controller to enable multi-bank processing-in-memory (PIM) commands, which are more bandwidth-efficient and can therefore improve effective command bandwidth. This allows for performance to be improved for emerging workloads that are bottlenecked by command throughput. These mechanisms enable emerging workloads to supply commands to dynamic random-access memory (DRAM) at a faster rate and thus more effectively exploit memory bandwidth in systems where command throughput is a bottleneck. These systems include PIM-enabled devices executing sparse workloads, irregular workloads, workloads where the target data has not been perfectly aligned across the banks in a channel, and/or other workloads. While the techniques described herein refer to dynamically coalescing multi-bank memory commands, it should be understood that these techniques apply to any set of memory modules that share a control interface (e.g., a shared command bus). Also, it is noted that a "bank" can be referred to more generally as a "module", and the term "multi-bank" can also be referred to as "multicast".

In one implementation, a system includes PIM-enabled hardware. PIM-enabled hardware moves compute close to memory, availing logic close to the memory begets the benefit of higher memory bandwidth than that available to the host. As an example, a possible PIM configuration includes adding vector compute elements within each DRAM bank. In such a configuration, by enabling the host to trigger computation at multiple DRAM banks in parallel without requiring data movement across the DRAM interface, the PIM-enabled system is able to increase achievable memory bandwidth and improve performance for a growing category of data-limited workloads.

In one implementation, a memory includes PIM elements which are able to perform computations within the memory. A processor generates memory requests targeting the memory which are sent to a memory controller. The memory controller stores requests received from the processor in one or more queues, and the memory controller determines whether opportunities exist for coalescing multiple requests together into a single multi-bank request. After coalescing multiple requests into a single combined request, the memory controller conveys the single request and a multi-bank code, specifying which banks are targeted, across the memory bus to multiple separate banks. The memory banks process the request in parallel, and the PIM elements process the data next to each respective bank.

In one implementation, a sparse embedding lookup operation is performed, which is common to many recommendation machine learning networks, with the lookup operation often dominating execution time. This lookup operation sparsely reads large embeddings (e.g., arrays containing hundreds of elements) out of a massive embedding table (containing millions of embedding entries) and accumulates them together. There is often minimal reuse, so performance is highly sensitive to memory bandwidth. For systems where PIM elements are included in the DRAM, data transfer across the DRAM interface can be avoided, so performance is instead limited by the rate at which PIM commands can be sent to DRAM. Coalescing multiple PIM commands into a single multi-bank command increases effective command bandwidth and improves overall performance for these lookup operations.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, memory device(s) 140, display controller 150, and display 155. In other implementations, computing system 100 includes other components and/or computing system 100 is arranged differently. Processors 105A-N are representative of any number of processors which are included in system 100.

In one implementation, processor 105A is a general purpose processor, such as a central processing unit (CPU). In this implementation, processor 105A executes a driver 110 (e.g., graphics driver) for controlling the operation of one or more of the other processors in system 100. It is noted that depending on the implementation, driver 110 can be implemented using any suitable combination of hardware, software, and/or firmware. In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In some implementations, processors 105A-N include multiple data parallel processors. In one implementation, processor 105N is a GPU which provides pixels to display controller 150 to be driven to display 155.

Memory controller(s) 130 are representative of any number and type of memory controllers accessible by processors 105A-N. While memory controller(s) 130 are shown as being separate from processor 105A-N, it should be understood that this merely represents one possible implementation. In other implementations, a memory controller 130 can be embedded within one or more of processors 105A-N and/or a memory controller 130 can be located on the same semiconductor die as one or more of processors 105A-N. Memory controller(s) 130 are coupled to any number and type of memory devices(s) 140. For example, the type of memory in memory device(s) 140 includes high-bandwidth memory (HBM), non-volatile memory (NVM), Dynamic Random Access Memory (DRAM), Static Random Access Memory (SRAM), NAND Flash memory, NOR flash memory, Ferroelectric Random Access Memory (FeRAM), or others. In one implementation, memory device(s) 140 include processing-in-memory (PIM) device(s) 145 for performing computations closer to the data.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is used to receive and send network messages across a network (not shown).

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
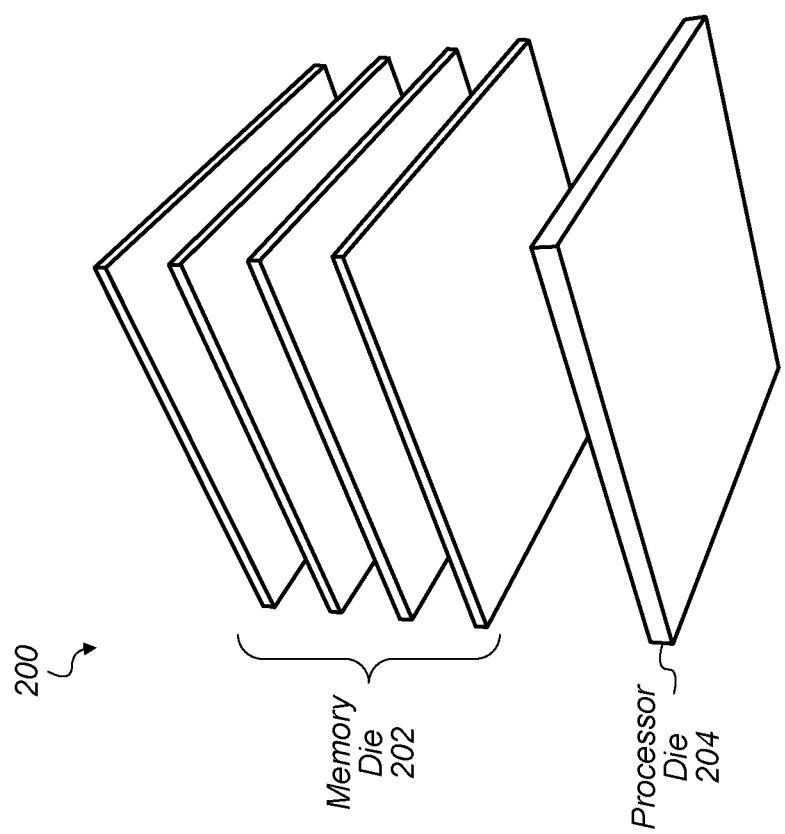
FIG. 2 is a block diagram of one implementation of a PIM-enabled system.

Turning now to FIG. 2, a block diagram of one implementation of a PIM-enabled system 200 is shown. In one implementation, PIM-enabled system 200 includes a vertical die stack of memory die 202 and processor die 204 (the relative size and location of FIG. 2 are not necessarily to scale). Memory die 202 includes a stacked memory device where the stacked die implement memory circuitry, such as DRAM, SRAM, ROM, and the like. Processor die 204 implements hard-wired logic and routing logic for accessing the memory circuitry of the stacked memory die 202. PIM-enabled system 200 can be fabricated using any of a variety of 3D integrated circuit fabrication processes. It is noted that in other implementations, other configurations and structures of PIM-enabled systems, including non-3D-stacked memory which may also be limited by command bandwidth, can be utilized.

In one implementation, processor die 204 and memory die 202 are implemented as separate substrates (e.g., bulk silicon) with active devices and one or more metal routing layers formed at an active surface. This approach can include a wafer-on-wafer process whereby a wafer comprising a matrix of die is fabricated and thinned, and through-silicon vias (TSVs) are etched through the bulk silicon. Multiple wafers are then stacked to achieve the illustrated layer configuration (e.g., a stack of four wafers comprising memory circuitry die for the four memory layers and a wafer comprising the logic die for the processor layer), aligned, and then joined via thermocompression. The resulting stacked wafer set is singulated to separate the individual 3D IC device. In other implementations, other techniques for fabricating PIM-enabled system 200 can be utilized.

Figure 3:
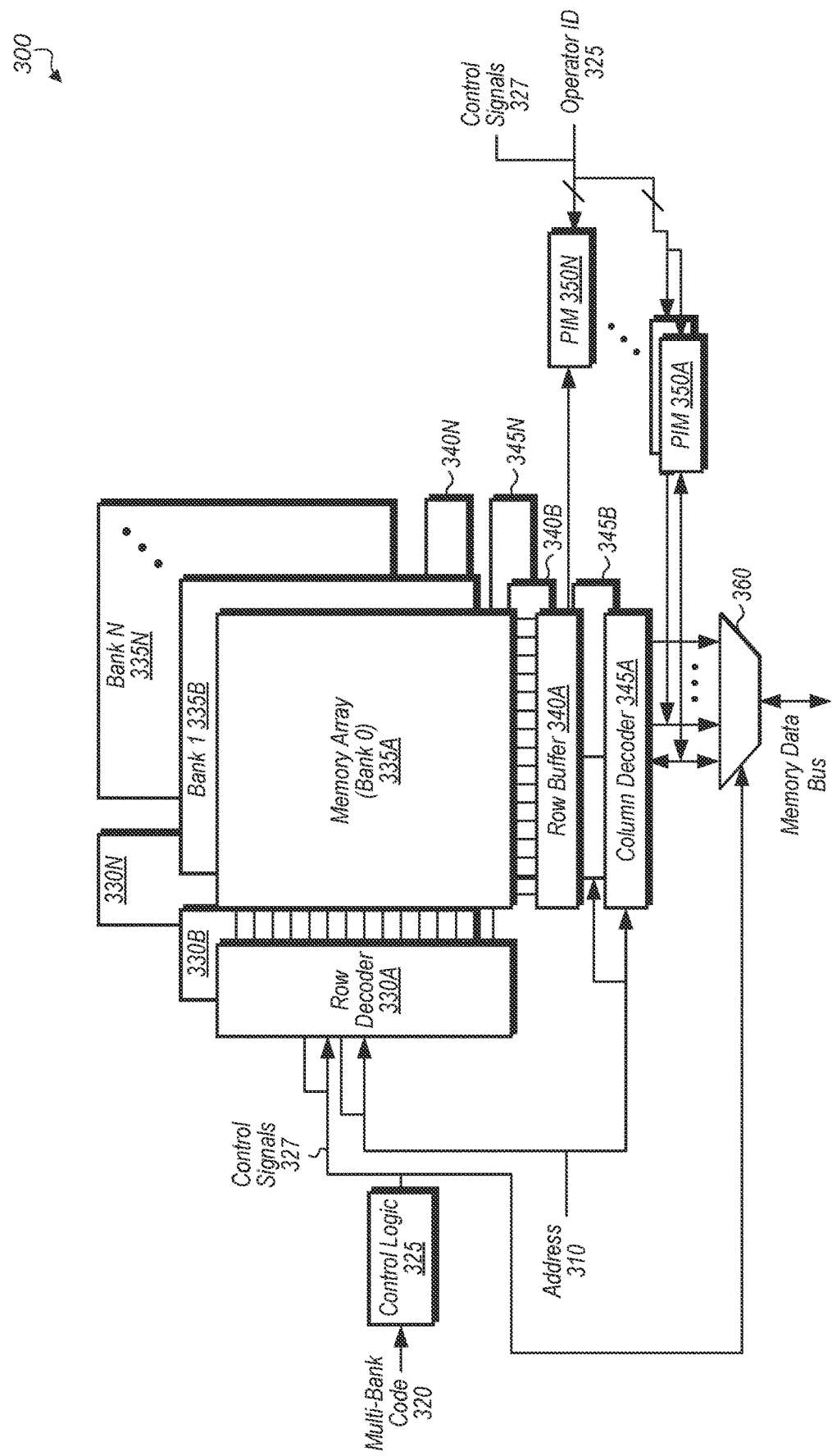
FIG. 3 is a block diagram of one implementation of a memory device.

Referring now to FIG. 3, a block diagram of one implementation of a memory device 300 is shown. To access data in memory 300 a row in the bank 335A-N corresponding to the address 310 of the given access is activated by row decoder 330A-N. This causes data in the row to be copied to the row buffer 340A-N associated with the bank 335A-N. Subsequent to the row being copied to row buffer 340A-N, a column command is sent to access the specific column within the row buffer 340A-N. It is noted that multiple row decoders 330A-N could activate multiple rows in a single cycle, depending on how many banks are being targeted by the access. If multiple banks are being targeted by the access, then multi-bank code 320 will identify these multiple banks. Multi-bank code 320 is coupled to control logic 325, with the output of control logic 325 coupled to row decoders 330A-N and/or banks 335A-N. In one implementation, control logic 325 decodes multi-bank code 320 into control signals 327 which are coupled to various locations within memory 300.

If a given bank 335A-N is targeted by a multi-bank access, then the row specified by a corresponding row decoder 330A-N is activated and the data read out of the bank and into the corresponding row buffer 340A-N. It is noted that multiple rows can be read out of multiple banks 335A-N into multiple row buffers 340A-N in parallel in any given cycle. Then, the column decoders 345A-N read out the targeted columns from the row buffers 340A-N and provide the data to the memory data bus via multiplexer 360. The data retrieved by column decoders 345A-N is also provided to corresponding PIM devices 350A-N for an operation by the PIM devices 350A-N, with the operation (e.g., addition, multiplication, XOR) specified by operator identifier (ID)

325. Multiple PIM devices 350A-N can be activated in any given cycle by corresponding column commands. It is noted that memory device 300 is one example of a memory device that can process multi-bank commands according to one implementation. In other implementations, other types of memory devices with other types of components and/or structured in other suitable manners are possible.

Figure 4:
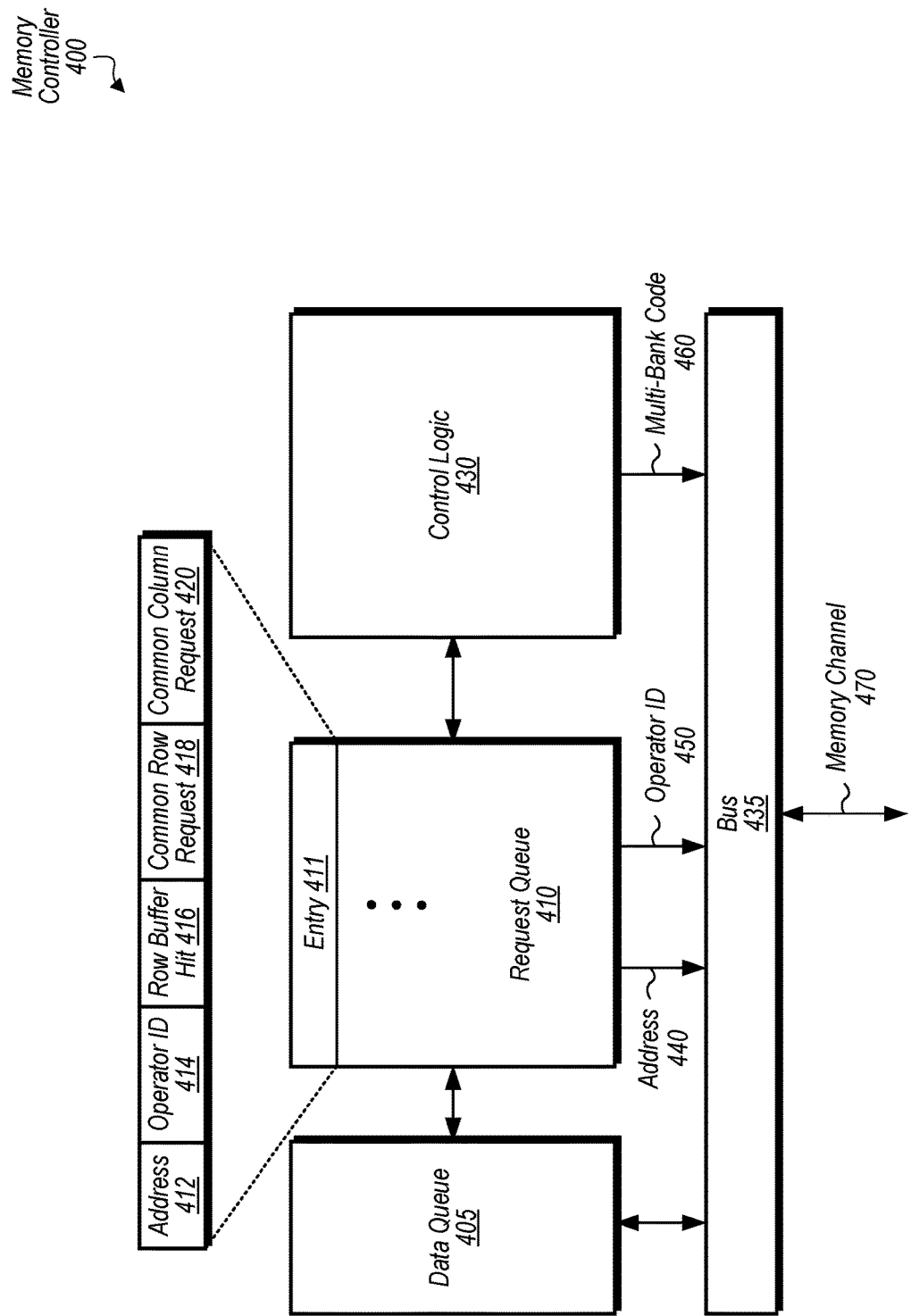
FIG. 4 is a block diagram of one implementation of a memory controller.

Turning now to FIG. 4, one implementation of a memory controller 400 is shown. In one implementation, memory controller 400 includes data queue 405, request queue 410, control logic 430, and bus 435. Memory controller 400 is connected to any number of memory devices (e.g., memory device 300 of FIG. 3) via memory channel 470. It should be understood that memory controller 400 can include other components which are not shown in FIG. 4 to avoid obscuring the figure. It is noted that memory controller 400 is intended to represent one implementation of the components and structure of a memory controller. In other implementations, memory controller 400 can include other components and/or be structured in other ways than is shown for FIG. 4.

When memory controller 400 receives requests targeting the memory device(s) accessible via memory channel 470, the requests are enqueued in request queue 410. In one implementation, request queue 410 contains requests from one or more data clients. These one or more data clients may be one or more portions of processors 105A-N (of FIG. 1). Control logic 430 analyzes the requests to look for opportunities to reorder and/or combine multiple requests to different modules into a single multicast request to more efficiently utilize the limited bandwidth of memory channel 470. When combining multiple requests into a single multicast request, control logic 430 also generates a multi-module code to identify which modules are targeted by the multicast request. To help in finding such opportunities, each entry in request queue 410 includes additional fields to facilitate the analysis performed by control logic 430. For example, in addition to address field 412 and operator ID field 414, representative entry 411 includes a row buffer hit field 416, common row request field 418, and common column request field 420. In other implementations, each entry in request queue 410 can include other types of fields. It is noted that fields 416, 418, and 420 can collectively be referred to as "match information".

In one implementation, row buffer hit field 416 stores an indicator which specifies if there is a subsequent request in request queue 410 which is a row buffer hit with this particular request. Also, in one implementation, common row request field 418 stores an indicator which specifies if there is a subsequent entry in request queue 410 which is request to a common row but to a different bank. Depending on the implementation, the indicator in common row request field 418 can be a single bit, a counter, or an identifier specifying the first such match in request queue 410. When a new request is received by memory controller 400, control logic 430 searches for row and column matches that may exist with the existing entries of request queue 410. If a hit is found between the new request and any requests stored in the existing entries, the match information of the matching entries is updated.

Also, in one implementation, common column request field 420 stores an indicator which specifies if there is a subsequent entry in request queue 410 which is a request to a common column but to a different bank. The indicator stored in common column request field 420 can be a single bit, a counter, or an identifier specifying the first such match in request queue 410. In one implementation, when a potential scheduling match or optimization is detected in a new request, control logic 430 inserts the new request as close as possible to the older request (after any other matching requests, according to match type priority) and updates the match information in the older request. In one implementation, for each memory bank, control logic 430 keeps track of pending row information to denote whether a hit is expected on the currently activated row buffer in the near future. As used herein, the term "pending row information" is defined as an added indicator associated with each bank that denotes whether the currently open row has been activated as part of a coalesced request and there is a pending column request in the queue to that row. This could mean either a) multiple row activations to different banks were coalesced and the associated column request will be issued subsequently, or b) multiple column operations can be coalesced, and the individual row activations have been issued prior to this.

When multiple requests are able to be combined into a multi-bank request, control logic 430 generates a multi-bank code 460 which is provided to bus 435. Also, the address 440 and operator ID 450 are provided by request queue 410 to bus 435. Multi-bank code 460 identifies which banks are targeted by the multi-bank request. It is noted that multi-bank code 460 can also be referred to herein as a "multi-bank mask". Although a multi-bank code can be referred to as a multi-bank mask, it should be understood that a multi-bank mask may be any arbitrary mapping of bits to subsets of banks. The function may be fixed or programmable, and the number of bits used and the mapping function may be established based on dynamic profiling or expected behavior communicated by hardware or the runtime software. In one implementation, the multi-bank request is sent over memory channel 470 to the corresponding memory device (e.g., memory device 300 of FIG. 3).

Any of various different methods for conveying the multi-bank request over memory channel 470 to the corresponding memory device can be employed, with the method varying from implementation to implementation. For example, in one implementation, a specified opcode and/or target address combination is repurposed to indicate a switch to or from multi-bank mode. Multi-bank mode then uses a reduced set of bits with a limited set of operation IDs and no bank address bits. Spare interface bits are used to specify the multi-bank code. In another implementation, when storing PIM operation information in register files to be indexed by subsequent PIM commands, multi-bank codes are stored in these registers. In a further implementation, an unused or underused opcode is repurposed to represent a single fixed or programmable type of coalesced request (e.g., row activation). In this implementation, the bank bits of the memory interface are used to specify the multi-bank code for this request type.

In order to find opportunities for coalescing commands, control logic 430 detects requests to different banks but the same row or column among the requests stored in request queue 410. In one implementation, control logic 430 compares four separate bit sets in parallel. These four separate bit sets include the operator ID bits of a request, the bank index bits, the row index bits, and the column index bits. If the row index bits match for multiple different requests to different banks, then control logic 430 coalesces multiple row activations into a multi-bank command. If the operator ID bits match and the column index bits match for multiple different requests to different banks, then control logic 430 coalesces multiple column accesses into a multi-bank command. As used herein, the term "coalesce" is defined as combining multiple requests, accesses, or activations into a single command at the point in time when a request is dequeued and about to be issued to the memory channel.

In one implementation, control logic 430 performs comparisons whenever a request is inserted into request queue 410. In one implementation, control logic 430 checks all requests in request queue 410 for a match. If barrier packets are used to restrict reorderings, then only the requests that arrived after the most recent barrier packet should be compared. In one implementation, in order to reduce the cost of detection, control logic 430 uses an address filter to detect potential matches before performing a compare (e.g., a bloom filter which is reset with every barrier packet or periodically). In another implementation, control logic 430 restricts match detection to a subset of the memory queue. For example, in this implementation, only the most recent N requests in the queue may be considered for match detection, where N is a positive integer. If memory requests are organized into per-bank queues, detection overheads can also be reduced by limiting which bank(s) are considered for match detection. In one implementation, only neighboring banks are considered for detection. However, in this implementation, even if only neighboring banks were considered for detection, all-bank coalescing would still be possible if a chain of detected matches could be established by repeatedly looking up the adjacent matches for each detected match.

Figure 5:
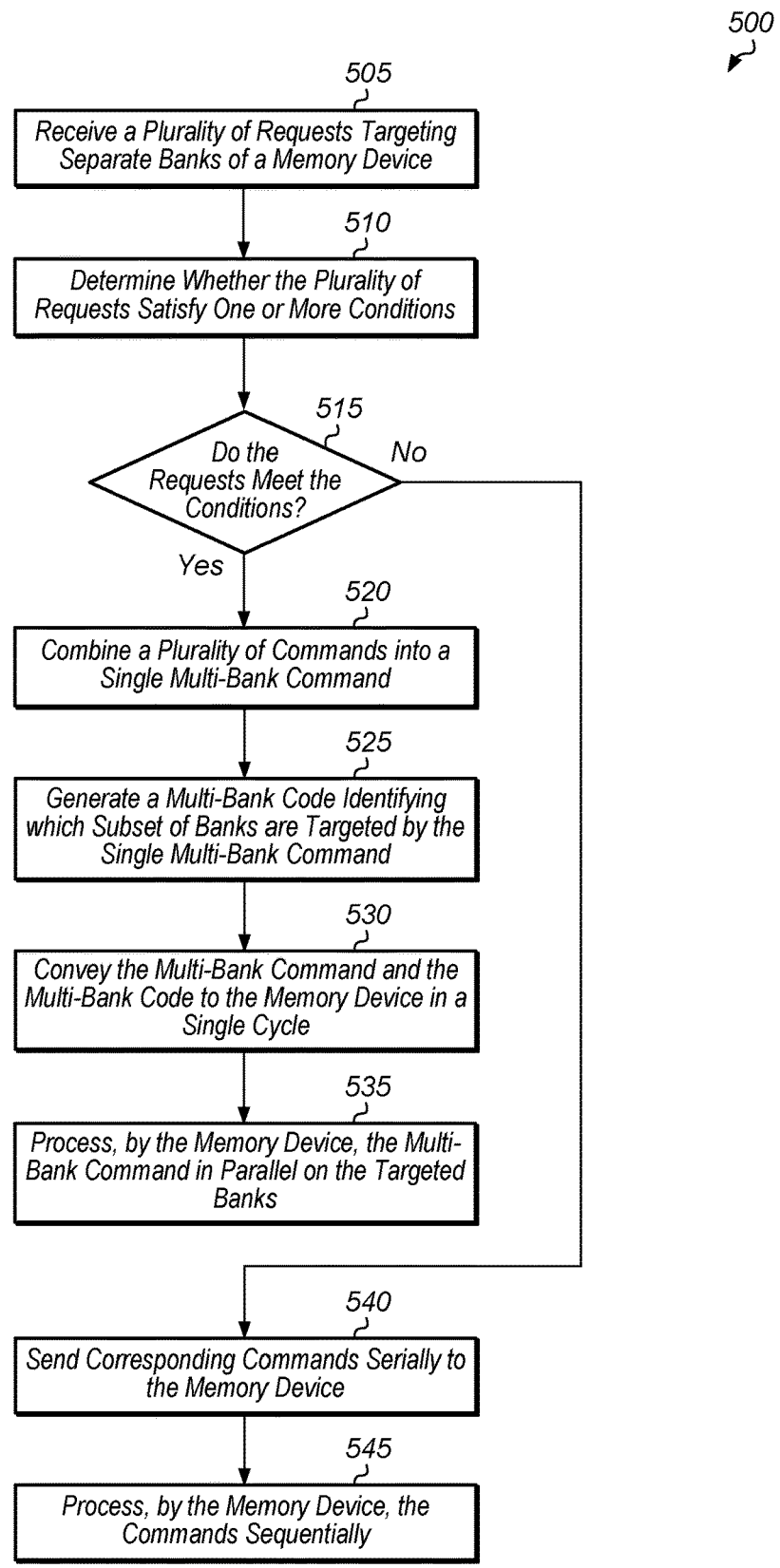
FIG. 5 is a generalized flow diagram illustrating one implementation of a method for dynamically coalescing memory commands into multi-bank commands.
Figure 6:
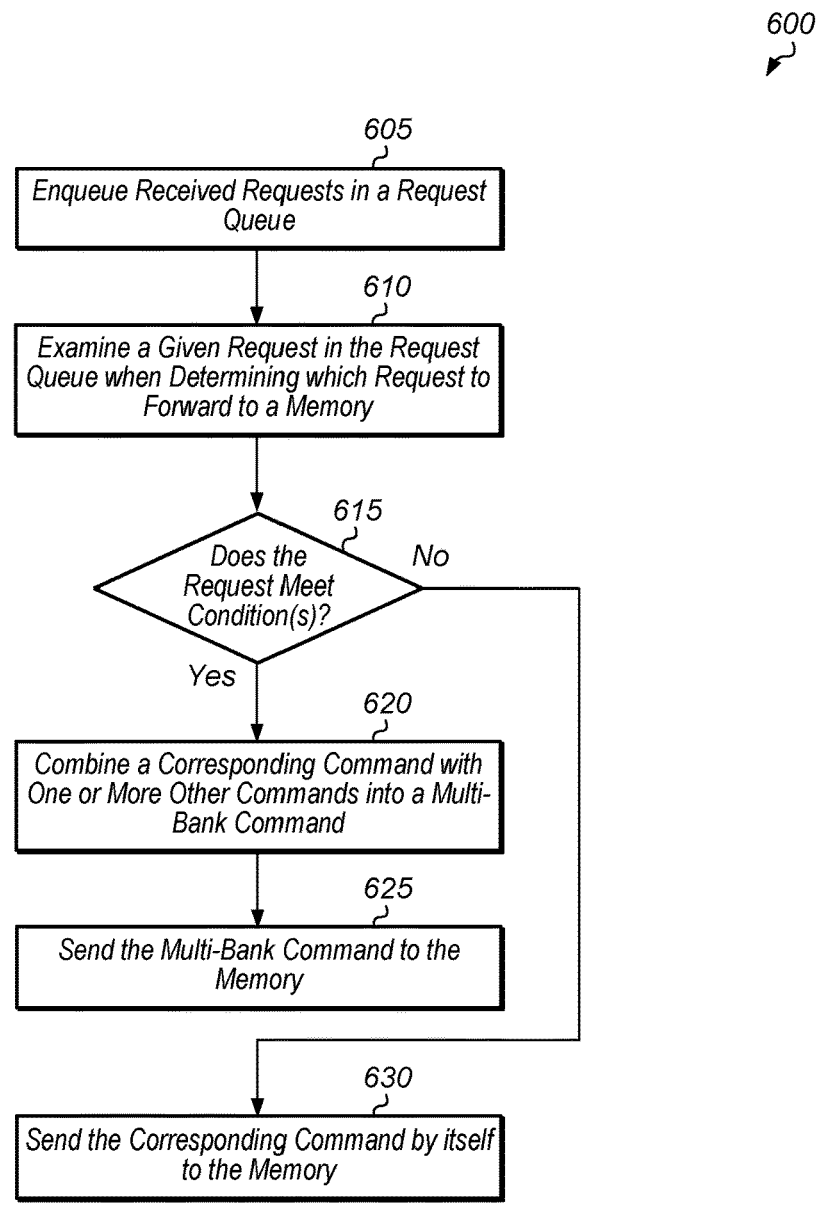
FIG. 6 is a generalized flow diagram illustrating one implementation of a method for dynamically coalescing memory commands into multi-bank commands.
Figure 7:
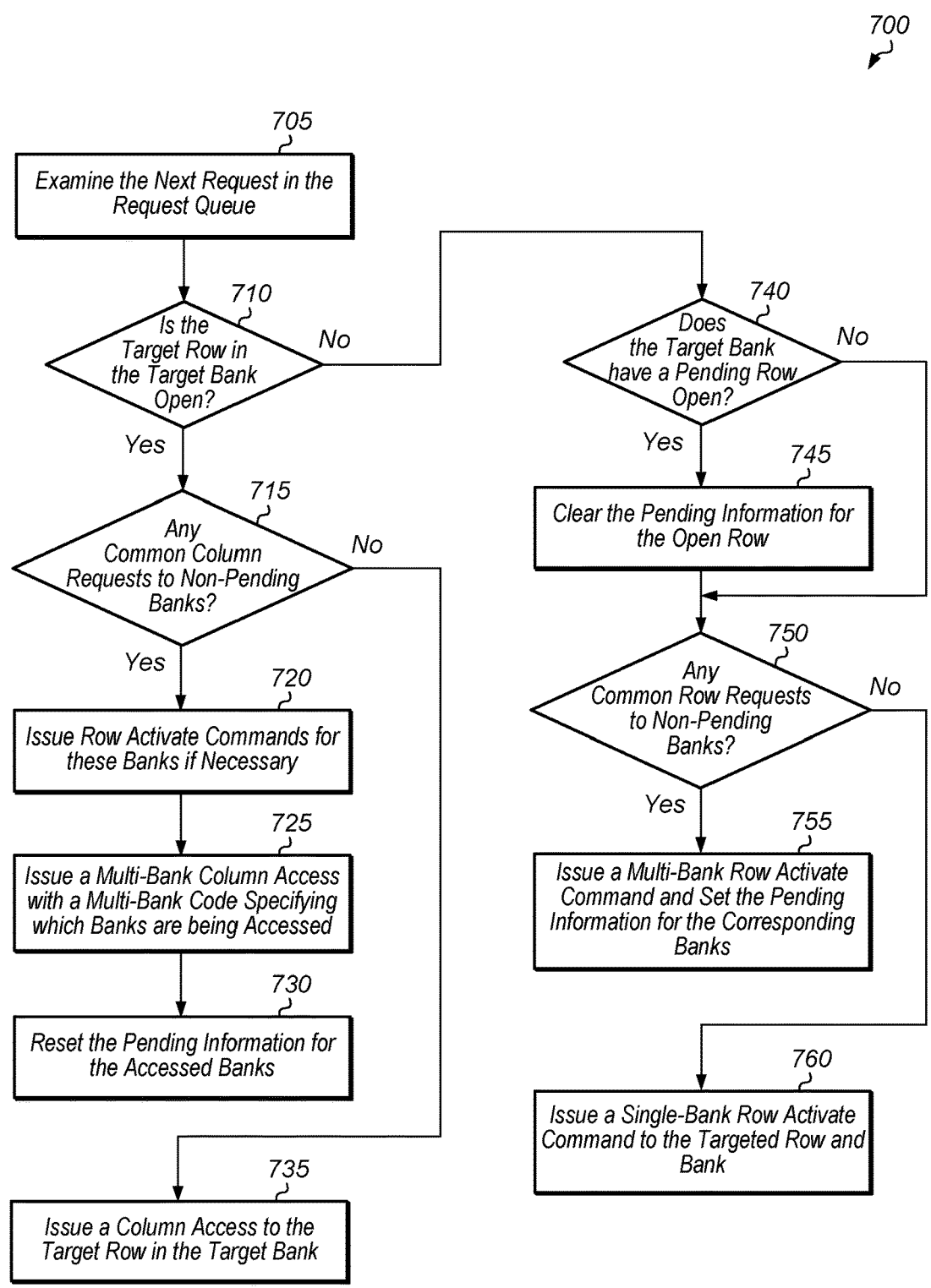
FIG. 7 is a generalized flow diagram illustrating one implementation of a method for operating a memory controller capable of coalescing multiple commands into a single multi-bank command.

Referring now to FIG. 5, one implementation of a method 500 for dynamically coalescing memory commands into multi-bank commands is shown. For purposes of discussion, the steps in this implementation and those of FIG. 6-7 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 500.

A memory controller receives a plurality of requests targeting separate banks of a memory device (block 505). The memory controller determines whether the plurality of requests satisfy one or more conditions (block 510). In one implementation, the one or more conditions include the requests targeting the same row in different banks. In another implementation, the one or more conditions include the requests targeting the same column in different banks and the requests sharing the same operator ID. In other implementations, the one or more conditions include other types of conditions.

If the plurality of requests meet the one or more conditions (conditional block 515, "yes" leg), then the memory controller combines a plurality of commands into a single multi-bank command (block 520) and the memory controller may trigger additional actions, depending on the aggressiveness of the coalescing logic. For example, in one implementation, the plurality of commands include row activate commands. In another implementation, the plurality of commands include column access commands. In other implementations, the plurality of commands are other types of commands associated with the original requests. The additional actions triggered by the memory controller may vary from implementation to implementation. For example, for a column match to a row that is not already open, the memory controller first generates a row activate command for that row. For a row match from a request (or chain of requests) that are further back in the queue, the memory controller moves these requests ahead of any intervening requests to the same bank.

Additionally, the memory controller generates a multi-bank code identifying which subset of banks are targeted by the single multi-bank command (block 525). Then, the memory controller conveys the multi-bank command and the multi-bank code to the memory in a single cycle (block 530). Next, the memory device processes the multi-bank command in parallel on the targeted banks (block 535). After block 535, method 500 ends. If the plurality of requests do not meet the one or more conditions (conditional block 515, "no" leg), then the memory controller sends corresponding commands serially to the memory device (block 540). Next, the memory device processes the commands sequentially (block 545). After block 545, method 500 ends.

Turning now to FIG. 6, one implementation of a method 600 for dynamically coalescing memory commands into multi-bank commands is shown. A memory controller enqueues received requests in a request queue (e.g., request queue 410 of FIG. 4) (block 605). The memory controller examines a given request in the request queue when determining which request to forward to a memory (block 610). If the request meets one or more conditions (conditional block 615, "yes" leg), then the memory controller combines a corresponding command with one or more other commands into a multi-bank command (block 620). For example, in one implementation, the corresponding command is a row activate command. In another implementation, the corresponding command is a column access command. In other implementations, the corresponding command is other types of commands associated with the original request.

In one implementation, the one or more conditions include the request targeting a common row as other request(s) in the request queue across multiple banks. In another implementation, the one or more conditions include the request targeting a common column as other request(s) in the request queue but different banks while also sharing a common operator ID as the other request(s). In other implementations, the one or more conditions include other types of conditions. After block 620, the memory controller sends the multi-bank command to the memory (block 625). After block 625, method 600 ends. Otherwise, if the request does not meet the one or more conditions (conditional block 615, "no" leg), then the memory controller sends the corresponding command by itself to the memory (block 630). After block 630, method 600 ends.

Referring now to FIG. 7, one implementation of a method 700 for operating a memory controller capable of coalescing multiple commands into a single multi-bank command is shown. A memory controller examines the next request in the request queue (block 705). If the target row in the target bank addressed by the next request is already open (conditional block 710, "yes" leg), then if there are any common column requests to non-pending banks (conditional block 715, "yes" leg), then the memory controller issues row activate commands for these banks if necessary (block 720). As used herein, a "non-pending bank" is defined as a bank having pending row information that does not indicate a future column access is imminent. Next, the memory controller issues a multi-bank column access with a multi-bank code specifying which banks are being accessed (block 725). Then, the memory controller resets the pending information for the accessed banks, unless the request has an associated row hit, in which case the bank is updated with the associated hit information (block 730). If there are no common column requests to non-pending banks (conditional block 715, "no" leg), then the memory controller issues a column access to the target row in the target bank (block 735). After block 735, method 700 ends.

If the target row in the target bank addressed by the next request is not already open (conditional block 710, "no" leg), then if the target bank has a pending row open (conditional block 740, "yes" leg), then the memory controller clears the pending information for the open row (block 745). In another implementation, the memory controller finds and issues the next request that accesses the pending row in block 745 rather than clearing the pending information. The choice on which implementation to use for block 745 depends on the aggressiveness of bandwidth optimization.

If the target bank does not have a pending row open (conditional block 740, "no" leg), then the memory controller determines if there are any common row requests to non-pending banks (conditional block 750). If there are any common row requests to non-pending banks (conditional block 750, "yes" leg), then the memory controller issues a multi-bank row activate command and sets the pending information for the corresponding banks (block 755). After block 755, method 700 ends. If there are no common row requests to non-pending banks (conditional block 750, "no" leg), then the memory controller issues a single-bank row activate command to the targeted row and bank (block 760). After block 760, method 700 ends. It is noted that method 700 can be performed each time the memory controller selects the next request in the request queue.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A memory controller comprising:
   a request queue configured to store requests that target a memory; and
   control circuitry configured to service a plurality of requests stored in the request queue with a single command by sending the single command to each of at least two banks of the memory, responsive to the plurality of requests in the request queue satisfying a condition.

2. The memory controller as recited in claim 1, wherein the single command is a multi-bank command.

3. The memory controller as recited in claim 2, wherein the multi-bank command identifies at least two banks of the memory.

4. The memory controller as recited in claim 1, wherein the control circuitry is configured to generate a single read command and an identification of a plurality of banks of the memory, responsive to the plurality of requests in the request queue satisfying the condition.

5. The memory controller as recited in claim 1, wherein the condition comprises at least one of: the plurality of requests targets a same row in multiple banks of the memory, and the plurality of requests target a same column in multiple banks of the memory.

6. The memory controller as recited in claim 1, wherein the memory controller is configured to transmit the single command to at least two banks of the memory.

7. The memory controller as recited in claim 6, wherein the at least two banks are activated in a single cycle.

8. The memory controller as recited in claim 1, wherein each of the plurality of requests comprises a command, and the control circuitry is configured to coalesce multiple commands from the plurality of requests into the single command.

9. A method comprising:
   storing received requests that target a memory in a request queue; and
   servicing a plurality of requests stored in the request queue with a single command by sending the single command to each of at least two banks of the memory, responsive to the plurality of requests in the request queue satisfying a condition.

10. The method as recited in claim 9, wherein the single command is a multi-bank command.

11. The method as recited in claim 10, wherein the multi-bank command identifies at least two banks of the memory.

12. The method as recited in claim 9, further comprising generating a single read command and an identification of a plurality of banks of the memory, responsive to the plurality of requests in the request queue satisfying the condition.

13. The method as recited in claim 9, wherein the condition comprises at least one of: the plurality of requests targets a same row in multiple banks, and the plurality of requests target a same column in multiple banks of the memory.

14. The method as recited in claim 9, further comprising transmitting the single command to at least two banks of the memory.

15. The method as recited in claim 14, wherein the at least two banks are activated in a single cycle.

16. The method as recited in claim 9, wherein each of the plurality of requests comprises a command, and the method comprises coalescing multiple commands from the plurality of requests into the single command.

17. A system comprising:
   one or more clients comprising circuitry configured to generate requests targeting a memory; and
   a memory controller comprising circuitry configured to service a plurality of requests received from the one or more clients with a single command by sending the single command to each of at least two banks of the memory, responsive to the plurality of requests satisfying a condition.

18. The system as recited in claim 17, wherein the memory controller is configured to generate a single read command and an identification of a plurality of banks of the memory, responsive to the plurality of requests satisfying the condition.

19. The system as recited in claim 18, wherein the condition comprises at least one of: the plurality of requests targets a same row in multiple banks, and the plurality of requests target a same column in multiple banks of the memory.

20. The system as recited in claim 18, wherein the memory controller is further configured to transmit the single command to multiple banks in parallel.

\* \* \* \* \*